(12) United States Patent
Berkowitz et al.

(10) Patent No.: US 11,238,054 B2
(45) Date of Patent: *Feb. 1, 2022

(54) SEARCHING MULTIPLE DATA SOURCES

(71) Applicant: Openlane, Inc., Redwood City, CA (US)

(72) Inventors: Ed Berkowitz, Redwood City, CA (US); Zachary E. Hallowell, Redwood City, CA (US)

(73) Assignee: OPENLANE, INC, Redwood City, CA (US)

( * ) Notice: Subject to any disclaimer, the term of this patent is extended or adjusted under 35 U.S.C. 154(b) by 1181 days.

This patent is subject to a terminal disclaimer.

(21) Appl. No.: 15/274,291

(22) Filed: Sep. 23, 2016

(65) Prior Publication Data
US 2017/0011097 A1    Jan. 12, 2017

Related U.S. Application Data

(63) Continuation of application No. 13/963,405, filed on Aug. 9, 2013, now Pat. No. 9,454,585.

(51) Int. Cl.
*G06F 16/2458* (2019.01)
*G06F 16/242* (2019.01)
*G06F 16/2455* (2019.01)
*G06F 21/41* (2013.01)

(52) U.S. Cl.
CPC ...... *G06F 16/2471* (2019.01); *G06F 16/2428* (2019.01); *G06F 16/2455* (2019.01); *G06F 21/41* (2013.01)

(58) Field of Classification Search
CPC .......... G06F 17/30545; G06F 16/2428; G06F 16/2471; G06F 16/2455; G06F 21/41
See application file for complete search history.

(56) References Cited

U.S. PATENT DOCUMENTS

| | | | |
|---|---|---|---|
| 6,519,618 B1 * | 2/2003 | Snyder | G06Q 10/10 707/738 |
| 6,704,726 B1 * | 3/2004 | Amouroux | G06F 16/24524 |
| 6,938,098 B1 | 8/2005 | Ukigawa et al. | |
| 8,676,695 B2 * | 3/2014 | Andreasen | G06Q 30/06 705/37 |

(Continued)

OTHER PUBLICATIONS

Non-Final Office Action corresponding to U.S. Appl. No. 13/963,405 dated Oct. 20, 2015, 14 pages.

*Primary Examiner* — Kannan Shanmugasundaram
(74) *Attorney, Agent, or Firm* — Lempia Summerfield Katz LLC

(57) ABSTRACT

A computer implemented method for searching data in a plurality of data sources is described. At a host system, a request to search a local data source is received. The request is associated with a user account of the local data source. The request is processed to determine one or more third party data sources associated with the user account. Local search parameters associated with the local data source and third party search parameters associated with the one or more third party data sources are dynamically assembled. The local search parameters and the third party search parameters are transmitted to a client device for display. A host system comprising a processor and memory storing instructions for implementing the method is also described.

20 Claims, 6 Drawing Sheets

(56) References Cited

U.S. PATENT DOCUMENTS

| | | | |
|---|---|---|---|
| 9,002,934 B1* | 4/2015 | Lunenfeld | G06Q 30/0256 |
| | | | 709/203 |
| 9,454,585 B2 | 9/2016 | Berkowitz et al. | |
| 2005/0005168 A1* | 1/2005 | Dick | G06F 16/217 |
| | | | 707/999.009 |
| 2006/0074980 A1* | 4/2006 | Sarkar | G06F 16/958 |
| 2007/0192300 A1* | 8/2007 | Reuther | G06F 16/2452 |
| 2008/0154707 A1 | 6/2008 | Mittal et al. | |
| 2010/0082634 A1* | 4/2010 | Leban | G06F 16/9038 |
| | | | 707/741 |
| 2011/0093923 A1 | 4/2011 | Yau et al. | |
| 2011/0271321 A1 | 11/2011 | Soppera et al. | |
| 2011/0276555 A1* | 11/2011 | Fiero | G06F 16/951 |
| | | | 707/706 |
| 2011/0289074 A1* | 11/2011 | Leban | G06F 16/9038 |
| | | | 707/722 |
| 2012/0023565 A1* | 1/2012 | Tumanyan | G06F 21/41 |
| | | | 726/8 |
| 2012/0239519 A1* | 9/2012 | Wu | G06Q 30/06 |
| | | | 705/26.3 |
| 2013/0061333 A1* | 3/2013 | Davis | H04L 63/0861 |
| | | | 726/28 |
| 2013/0262241 A1* | 10/2013 | Nelson | G06Q 30/0276 |
| | | | 705/14.72 |

\* cited by examiner

FIG. 4

SEARCHING MULTIPLE DATA SOURCES

REFERENCE TO RELATED APPLICATION

The application is a continuation of U.S. application Ser. No. 13/963,405 (now U.S. Pat. No. 9,454,585), which is incorporated by reference herein in its entirety.

BACKGROUND

Often it is necessary to subscribe to multiple data sources in order to retrieve as much information as possible for an item of interest. In order to thoroughly research the item of interest, a first search is conducted on one of the data sources. Each item returned as a result of the first search has to be cross-referenced with information in the other data sources in order to provide a complete picture for the item.

For example, consider a user searching for a vehicle. The user subscribes to a first data source, such as online vehicle auction. The user may also subscribe to other data sources such as a data source for vehicle history reports and a data source for pricing guides. In order to search for vehicles, the user searches the online vehicle auction source. The user then takes the results of the search and, for each vehicle, conducts further searches on the data source for vehicle history reports and the data source for pricing guides to get a more complete picture for the vehicle. However, such a process is time consuming.

Accordingly, it is desirable to provide a more efficient system and method for searching multiple databases.

SUMMARY

In accordance with an aspect of the present embodiment, there is provided a computer implemented method for searching data in a plurality of data sources the method comprising: receiving, at a host system, a request to search a local data source, the request being associated with a user account of the local data source; processing the request to determine one or more third party data sources associated with the user account; dynamically assembling local search parameters associated with the local data source and third party search parameters associated with the one or more third party data sources; and transmitting the local search parameters and the third party search parameters to a client device for display.

In accordance with a further aspect of the present embodiment, there is provided a host system configured to search a plurality of data sources, the host system comprising: a processor; and memory storing instructions which, when executed, cause the processor to: receive a request to search a local data source, the request being associated with a user account of the local data source; process the request to determine one or more third party data sources associated with the user account; dynamically assembling local search parameters associated with the local data source and third party search parameters associated with the one or more third party data sources; and transmitting the local search parameters and the third party search parameters to a client device for display.

BRIEF DESCRIPTION OF THE DRAWINGS

Embodiments of the invention will now be described by way of example only with reference to the following drawings in which:

FIG. 4 is a sample graphical user interface illustrating search parameters displayed to a user prior to a search.

DETAILED DESCRIPTION OF THE PREFERRED EMBODIMENTS

Figure 1:
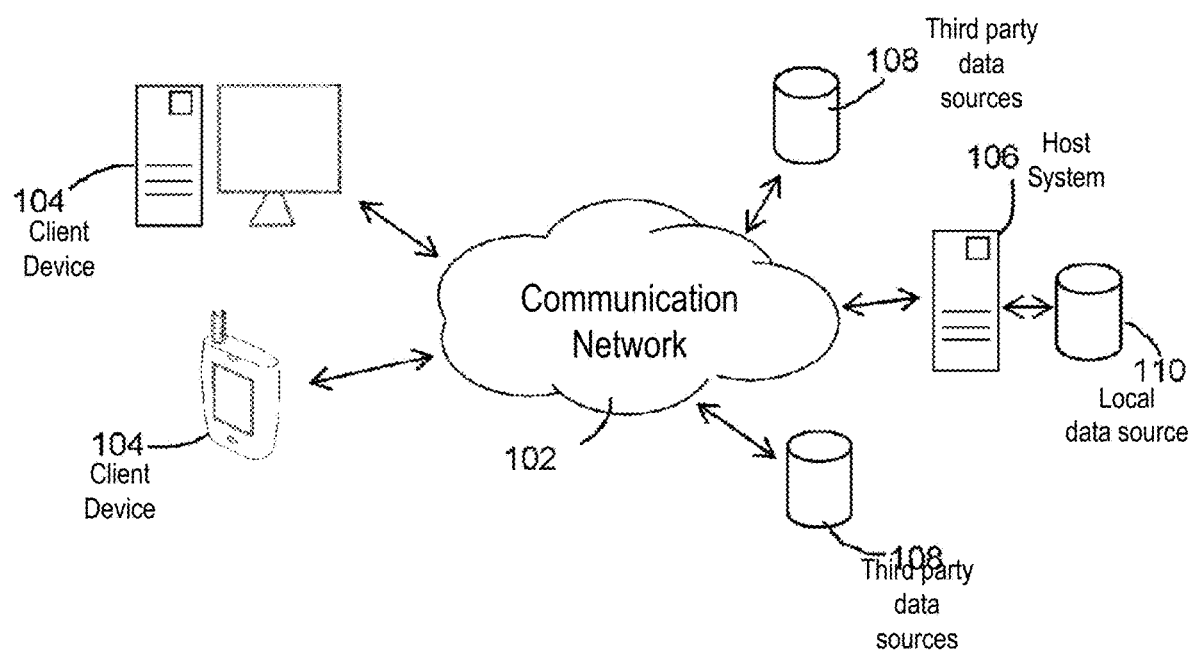
FIG. 1 is a block diagram illustrating a sample network infrastructure in which embodiments of the invention are implemented.

For convenience, like numerals in description reference like structures in the drawings. Referring to FIG. 1, a sample network infrastructure ("network") on which embodiments of the invention are implemented is illustrated generally by numeral 100. The network 100 includes a communication network 102, a plurality of client devices 104, a host system 106 and a plurality of third party data sources 108.

The communication network 102 includes Wide Area Networks (WANs), such as the Internet, Local Area Networks (LANs) and various combinations thereof, as will be appreciated by a person skilled in the art. The WANs and LANs may include various combination and wired and wireless connections, depending on the implementation. The client devices 104 are computing devices that may include, for example, desktop computers, notebook computers, tablets, smart phones and the like. The host system 106 and the third party data sources are computing devices such as a desktop computer, notebook computer, server or the like. The host system includes a local data source 110.

The communication network 102 facilitates communication between the client devices 104, the host system 106 and the third party data sources 108. The client devices 104 are configured to provide users with an interface to access information on the host system 106. The client devices 104 may provide access to the host system 106 via software. Examples of the software include a dedicated application and a generic network application. A dedicated application is one that is configured to communicate directly with a corresponding application on the host system 106. A generic network application refers, for example, to a web browser. As is known in the art, the web browser allows the user to navigate to the host system 106 by way of a uniform resource locator (URL). The web browser displays web pages received from the host system 106 to the user. The user enters data into the web pages and the web browser transmits the data to the host system 106. Similarly, the host system 106 may access the third party sources 108 via one or both of a dedicated application or a generic network application. Communication between the client devices 104, the host system 106, and the third party data sources 108 can be secured using known or proprietary encryption protocols.

Figure 2:
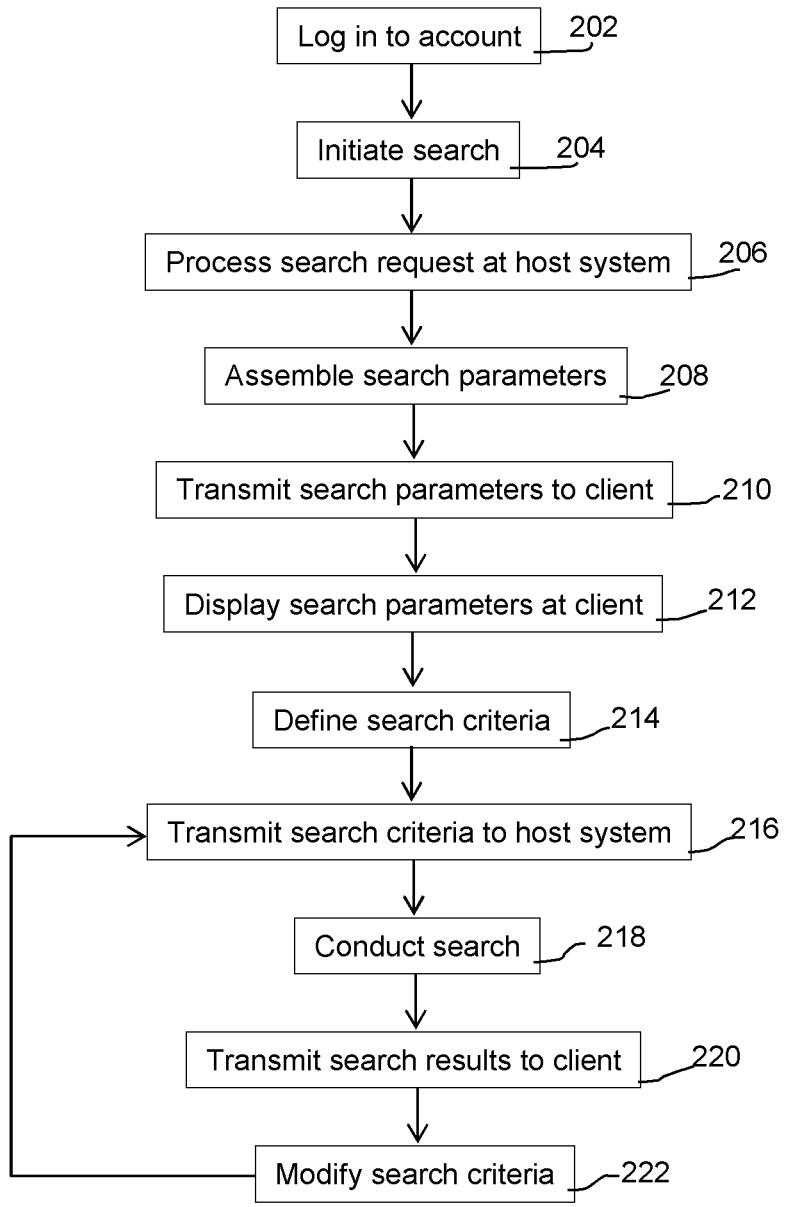
FIG. 2 is flow diagram illustrating a method for searching data in a plurality of data sources.

Referring to FIG. 2, a flow diagram illustrating a method for searching data in a plurality of data sources is shown generally by numeral 200. At step 202 the user uses the software on the client device 104 to access the host system 106 and logs in to a user account. In order to log in to the user account, the user provides user credentials such as a user name and a password. The host system 106 validates the user credentials and provides access to the user accordingly. At step 204, the user selects a search request. The search request may be selected, for example, by clicking on a button or hyperlink presented on a graphical user interface of the client device 104.

At step 206, the host system 106 processes the search request. Specifically, the host system 106 determines which of the third party data sources 108, in addition to the local data source 110, the user has permission to access. This determination can be performed a number of different ways. In a first embodiment, the host system 106 implements a single sign-on, which allows the user to establish a connection between the user account on the host system 106 and third party user accounts on corresponding third party data sources 108. The host system creates a mapping, which can be used to associate the user account with the third party user accounts. An example of a single sign-on system is described in more detail in U.S. Patent Application Publication No. 2012/0023565 by Hovhannes Tumanyan and titled "Systems and Methods for System Login and Single Sign-On". As will be appreciated by a person of ordinary skill in the art, other implementations of a single sign-on system can also be implemented.

In an alternative embodiment, the host system 106 can use a unique identifier associated with the user account and compare it with counterpart unique identifiers at the third party data sources 108. The unique identifier may be a single piece of information or a compilation of information. Information used as a basis for the unique identifier may include, a social insurance number, a tax identifier, an employer identification number, account numbers associated with the third party data sources 108, industry standard identification numbers, business number, address, and the like. The unique identifier can be used to identify the user's account with counterpart accounts at the third party data sources 108. For ease of explanation, the third party data sources 108 that the host system 106 determines the user to have permission to access are referred to as permitted data sources. The remaining third party data sources 108 are referred to as non-permitted data sources.

At step 208, the host system 106 assembles local search parameters for the local data source 110 and third party search parameters for the permitted data sources. The local parameters include parameters by which the local data source 110 is searchable. The third party parameters include parameters by which the permitted data sources are searchable. The third party parameters may be grouped based on their corresponding third party data source 108. As will be appreciated, the local search parameters and the third party search parameters may include, for example, a plurality of possible options available for a given parameter. The local search parameters and the third party search parameters may also include, for example, user-definable fields. As will be appreciated, the nature of the search parameters may vary depending on the implementation and the type of data that the local search parameters and the third party search parameters represent.

At step 210, the host system 106 transmits the local search parameters and the third party search parameters to the client device 104. At step 212, the local search parameters and the third party search parameters are displayed to the user via a graphical user interface on the client device 104. At step 214, the user defines search criteria by selecting desired ones of the local search parameters and the third party search parameters. As will be appreciated, selecting desired ones of the search parameters may include, for example, selecting one of a plurality of possible options available for a given parameter. Optionally, selecting desired ones of the search parameters may also include entering user values in the user-definable fields. The nature of the search parameters may vary, as will be appreciated by a person of ordinary skill in the art. The defined search criteria can be saved by the user and used in subsequent searches. For example, the user can save a particular set of search criteria as "Search1". The next time the user conducts a search, the user will be presented with Search1 in addition to the local search parameters and the third party search parameters. If the user selects Search1, the saved search criteria causes selected ones of the local search parameters and the third party search parameters to be automatically selected. The user can modify the search parameters before proceeding to the next step. At step 216, the search criteria are submitted from the client device 104 to the host system 106.

At step 218, the host system 106 conducts a search of the local data source and the permitted data sources using the search criteria to obtain search results. Specifically, the host system 106 searches the local data source 110 using the local search parameters of the search criteria to determine local search results. Further, the host system 106 searches the permitted data sources using the third party search parameters of the search criteria to determine third party search results. A search result is determined by combining the local search results and the third party search results.

At step 220, the search result is transmitted to the client device 104 for display to the user. In addition to the search results, the user may also be provided with the local search parameters and the third party search parameters to facilitate revision or further refinement of the search results. At step 222, a user modifies selection of the local search parameters and the third party search parameters, previously submitted, to define new search criteria. At step 216, the new search criteria are submitted from the client device 104 to the host system 106.

Accordingly, as will be appreciated, the user of the client device 104 is able to search multiple data sources via a common interface. This improves the accuracy of the search results returned to the user and reduces the amount of time the user has to spend finding a desired product.

Figure 3:
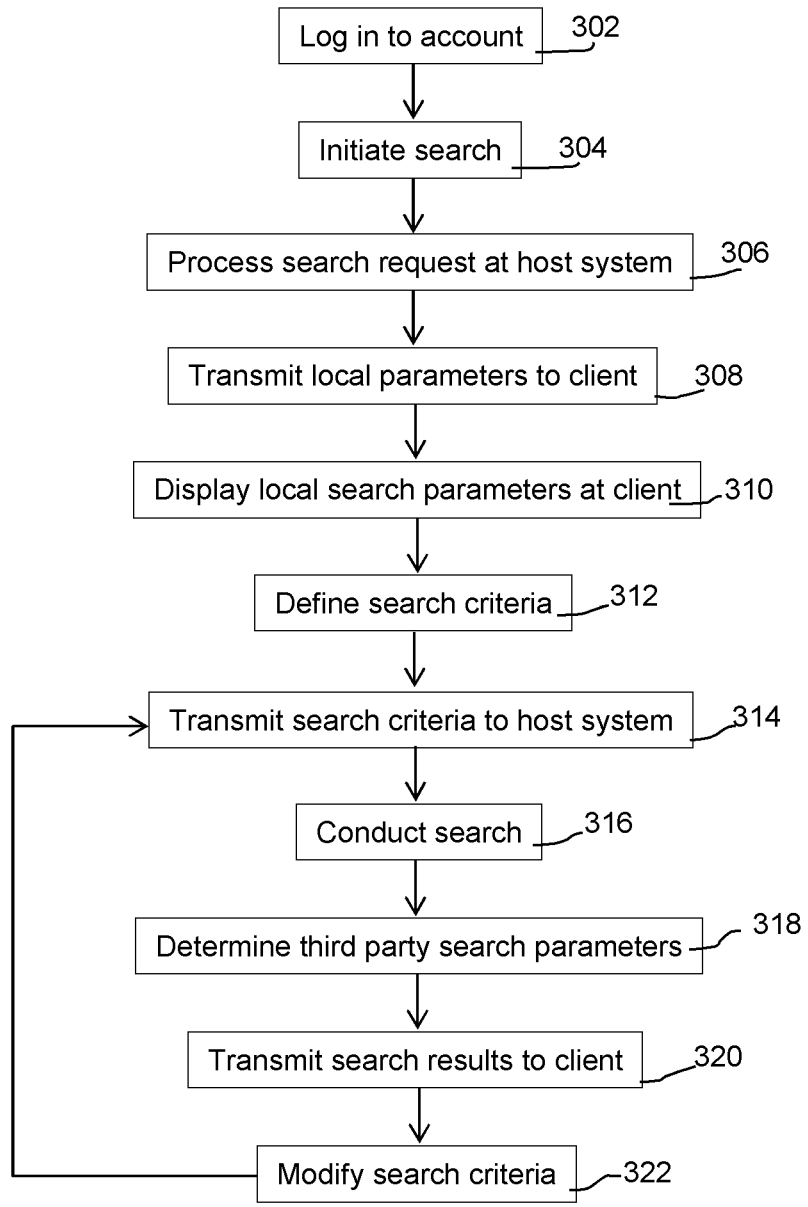
FIG. 3 is a flow diagram illustrating a method for searching data in a plurality of data sources in accordance with an alternate embodiment to that shown in FIG. 2.

Referring to FIG. 3, a flow diagram illustrating a method for searching data in a plurality of data sources in accordance with an alternate embodiment is shown generally by numeral 300. At step 302 the user uses the software on the client device 104 to access the host system 106 and logs in to a user account. The host system 106 validates the user credentials and provides access to the user accordingly. At step 304, the user selects a search request.

At step 306, the host system 106 processes the search request. Specifically, the host system 106 assembles local search parameters for the local data source 110. At step 308, the host system 106 transmits the local search parameters to the client device 104. At step 310, the local search parameters are displayed to the user via a graphical user interface on the client device 104. At step 312, the user defines search criteria by selecting desired ones of the local search parameters. At step 314, the search criteria are submitted from the client device 104 to the host system 106.

At step 316, the host system 106 conducts a search of the local data source to obtain search results. At step 318, the host system 106 determines which of the third party data sources 108 are the permitted data sources to which the user has permission to access and retrieves the corresponding third party search parameters.

At step 320, the search result is transmitted to the client device 104 for display to the user. In addition to the search results, host system 106 also transmits the third party search parameters to facilitate revision or further refinement of the search results. The local search parameters may also be transmitted with the third party search parameters.

At step 322, a user can modify selection of the local search parameters previously submitted and include third party search parameters to define new search criteria. At step 314, the new search criteria are submitted from the client device 104 to the host system 106.

Similar to the previously described embodiment, in this embodiment the user of the client device 104 is able to search multiple data sources via a common interface. However, in this embodiment a search of the local data source 110 is conducted prior to introducing the third party search parameters.

In the embodiments described above, only the third party search parameters associated with the permitted data sources are transmitted to the client device 104. However, in an alternative embodiment, third party parameters that are not associated with the permitted data sources are also transmitted to the client device 104. However, in this embodiment, the third party parameters that are not associated with the permitted data sources are not accessible by the user when establishing the search criteria. For example, the third party parameters that are not associated with the permitted data sources may displayed as "grayed out" so that they cannot be selected. In addition to, or in lieu of, the greyed out third party parameters, a message can be displayed that provides the user with information about getting access to the third party parameters. For example, contact information such as a telephone number, website or e-mail address, associated with the corresponding third party data source can be displayed. Optionally, a hyperlink can be provided directly to the third party data source, providing an opportunity for the user to gain access thereto. This can provide expose for the third party data sources 108 to potential new customers.

Further, in the embodiments described above, the local search parameters and the third party search parameters are retrieved from the local host 106 and transmitted to the client device 104 in response to a search request. However, in an alternative embodiment, the local search parameters and the third party search parameters can be stored locally at the client device 104 and updated as needed. In such an embodiment, the software on the client device 104 is used to authenticate the user at local host 106 to determine the permitted data sources. The software on the client device 104 "unlocks" the third party parameters based on the determined permitted data sources and presents the parameters to the user.

Figure 4:
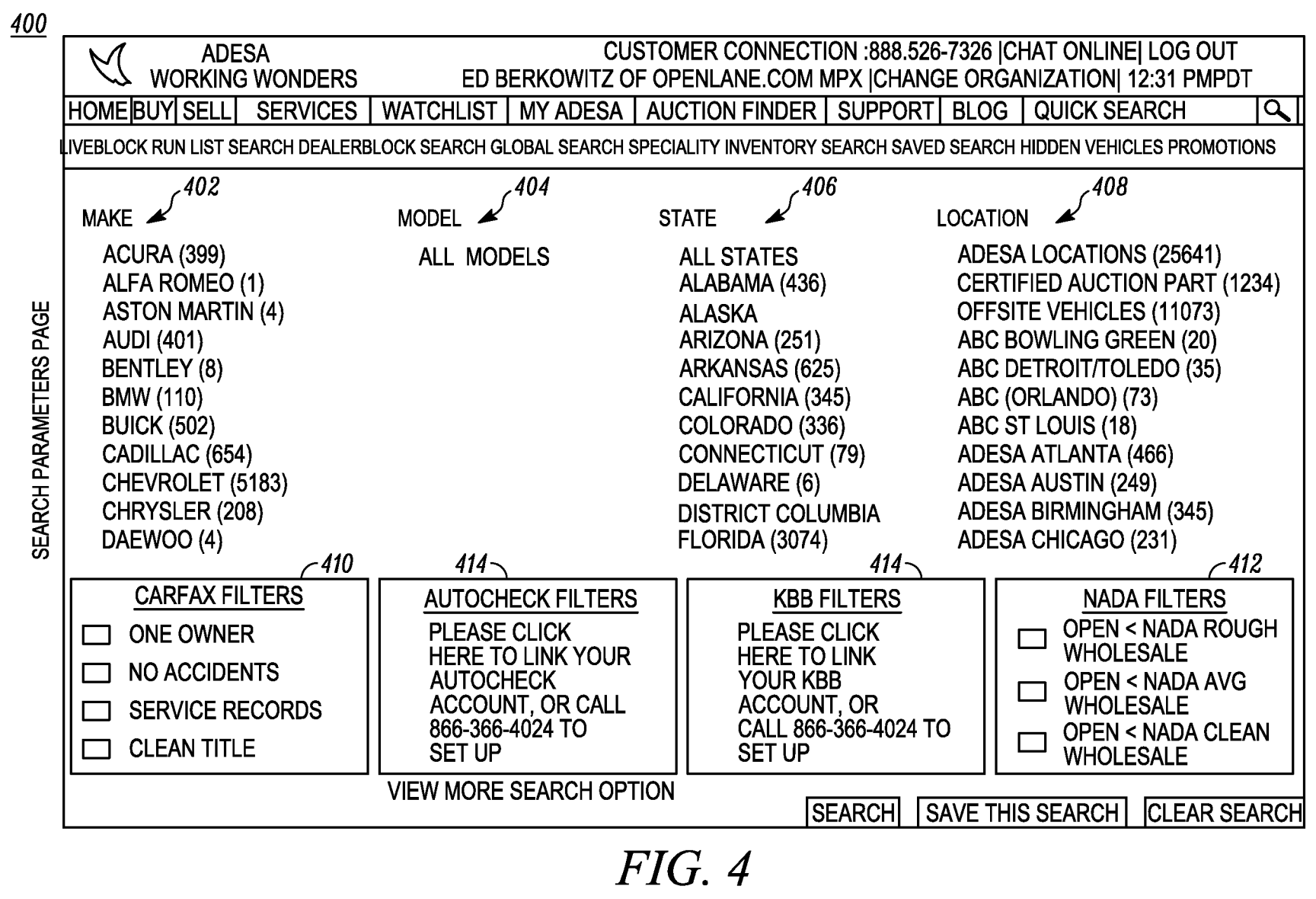

Referring to FIG. 4, an example of a graphical user interface presented to the user prior to conducting a search, including local search parameters and third party search parameters, is shown generally by numeral 400. In this example, the user is car dealer searching for used vehicles and the host system 104 is an auction system such as ADESA® DealerBlock™. Third party data sources 108 may include vendors that provide vehicle history reports and their normalized data attributes such as Carfax, AutoCheck and CarProof and the like. Third party data sources 108 may also include pricing guide book vendors such as Kelley Blue Book, Black Book, MMR, Galves and eBay and the like. Third party data sources 108 may also include financing vendors such as Chase Auto Finance, Ally Financial, GM Financial, Ford Signature Plan, AFC, MAFS and the like. Third party sources 308 may also include vehicle demand data vendors such as Cars.com, AutoTrader, CarsDirect, CarGurus and the like. Third party data sources 108 may also include vehicle data sources such as OEM Warranty systems, insurance reports, CLUE reports and the like. As will be appreciated by a person of ordinary skill in the art, a number of different third party data sources 108 can be provided, depending on the implementation.

In the example illustrated in FIG. 4, the local search parameters include vehicle make 402, vehicle model 404, state, 406 and vehicle location 408. Since the host system 104 has determined that the user has permission to access CARFAX and NADA, a first set of third party parameters 410 associated with CARFAX and a second set of third party parameters 412 associated with NADA are displayed on the graphical user interface 300. Although third party data sources 108 such as Kelly Blue Book and AutoCheck are available, the user does not have permission to access them. Accordingly, a message 414 is displayed on the graphical user interface 400 for each of these two third party data sources 108. The message provides contact information so that the user can set up an account with the third party data source 108 if desired.

Figure 5A:
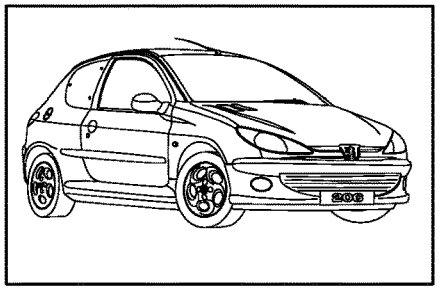
FIGS. 5A-B are a sample graphical user interface illustrating search parameters displayed to a user along with previously obtained search result.
Figure 5B:

Referring to FIGS. 5A-B, an example of a graphical user interface presented to the user to narrow existing search results is shown generally by numeral 500. The graphical user interface 400 includes local search parameters and third party search parameters. Continuing the example described with reference to FIG. 4, a list of results 502 are displayed in a main section of the graphical user interface. A list of sorting parameters 504 is provided. The sorting parameters 404 include a number of results per page, a feature or combination of features by which to sort the results and a list of vehicle sources to include in the results. The first set of third party parameters 410 and the second set of third party parameters (not shown), associated with permitted third party data sources are displayed on the graphical user interface 500. Similarly, the message 414 is displayed on the graphical user interface 500 for Kelley Blue Book and AutoCheck.

Using the foregoing specification, the invention may be implemented as a machine, process or article of manufacture by using standard programming and/or engineering techniques to produce programming software, firmware, hardware or any combination thereof.

Any resulting program(s), having computer-readable instructions, may be stored within one or more computer-usable media such as memory devices or transmitting devices, thereby making a computer program product or article of manufacture according to the invention. As such, the terms "software" and "application" as used herein are intended to encompass a computer program existent as instructions on any computer-readable medium such as on any memory device or in any transmitting device, that are to be executed by a processor.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, for example, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

Although preferred embodiments of the invention have been described herein, it will be understood by those skilled in the art that variations may be made thereto without departing from the scope of the appended claims.

The invention claimed is:

1. A computer implemented method for a client device to receive data searched from a plurality of data sources, the method comprising:

transmitting, from the client device to a host system, an interface request to search, the interface request being associated with a user account;

the interface request indicative to the host system to:
process the interface request to determine a first data source and a second data source associated with the user account, the first data source and the second data source being selected from vehicle history report vendors, pricing guide book vendors, financing vendors, vehicle demand data vendors, or vehicle data sources, the first data source being different from the second data source;
assemble a common interface comprising search parameters associated with the first data source and the second data source;
transmit the common interface comprising search parameters to the client device for display, wherein a first section of the common interface includes first search parameters associated with the first data source and a second section of the common interface includes second search parameters associated with the second data source, wherein at least one of the second search parameters being of a different type than the first search parameters, at least one of the first search parameters indicative of a narrowing of searching criteria for searching the first data source, at least one of the second search parameters indicative of a narrowing of searching criteria for searching the second data source;

receiving, at the client device, the common interface;

displaying, on a display of the client device, the common interface so that the common interface enables a client to select one or both of the first search parameters and the second search parameters from the common interface;

receiving, via the client interacting with the common interface on the display, an indication of client-requested one or more of the first search parameters associated with the first data source and an indication of client-requested one or more second search parameters associated with the second data source, wherein the client-requested one or more first search parameters associated with the first data source is of the different type from the client-requested one or more second search parameters associated with the second data source; and transmitting, to the host system, a search request including the indication of client-requested one or more of the first search parameters associated with the first data source and the indication of client-requested one or more second search parameters associated with the second data source;

the search request indicative to the host system to:
request a search of the first data source with the client-requested one or more first search parameters with the search of the first data source being narrowed by the at least one of the first search parameters and a search of the second data source with the client-requested one or more second search parameters with the search of the second data source being narrowed by the at least one of the second search parameters;
receive results of the search of the first data source with the client-requested one or more first search parameters associated with the first data source and results of the search of the second data source with the client-requested one or more second search parameters;
combine the results of the search of the first data source with the results of the search of the second data source; and
transmit, to the client device for display, the combined results of the search of the first data source with the results of the search of the second data source.

2. The method of claim 1, wherein the search request is for searching vehicles;
wherein the at least one of the first search parameters is indicative of a first vehicle feature in order to narrow the search of the first data source;
wherein the at least one of the second search parameters is indicative of a second vehicle feature in order to narrow the search of the second data source, wherein the first vehicle feature being different from the second vehicle feature;
wherein the common interface further includes other search parameters separate from the first search parameters and the second search parameters;
wherein the search parameters associated with the first data source and the second data source comprise third party search parameters;
wherein the first data source comprises a $1^{st}$ third party data source;
wherein the second data source comprises a $2^{nd}$ third party data source; and
wherein the search parameters associated with the first data source and the second data source comprise third party search parameters.

3. The method of claim 2, wherein the common interface further includes a separate section for the other search parameters, the separate section being separate from the first section that includes the first search parameters associated with the $1^{st}$ third party data source and the second section that includes the second search parameters associated with the $2^{nd}$ third party data source.

4. The method of claim 3, further comprising:
establishing a connection between the host system and one or more third party data sources; and
retrieving third party search parameters from the one or more third party data sources.

5. The method of claim 3, further comprising receiving, via the client interacting with the common interface on the display, an indication of client-requested one or more of the other search parameters associated with a local data source;
wherein the search request is further indicative to the host system to:

search the local data source using the client-requested one or more other search parameters in order to determine local search results; and combine the results of the search of the first data source, the results of the search of the second data source, and the determined local search results.

6. The method of claim 5, further comprising retransmitting the local search parameters, the first search parameters and the second search parameters to the client device for display along with the search results.

7. The method of claim 1, wherein determining the first data source and the second data source associated with the user account comprises determining which of a plurality of third party sources are permitted data sources that a user associated with the user account has permission to access; and wherein the transmitted search parameters include the first search parameters and the second search parameters associated with the permitted data sources and separate search parameters associated with other third party data sources.

8. The method of claim 7, wherein the separate search parameters associated with the other third party data sources are marked so that they not accessible on the client device.

9. The method of claim 7, wherein the separate search parameters associated with the other third party data sources include contact data related to the other third party data sources for display on the client device.

10. The method of claim 1, wherein the common interface displays both of the first search parameters and the second search parameters simultaneously; and wherein the at least one of the second search parameters of the different type than the first search parameters are for searching a different type of data than data search with the first search parameters.

11. The method of claim 1, wherein the first data source and the second data source are selected from different vehicle history report vendors.

12. The method of claim 1, wherein the first data source comprises a vehicle history report vendor; and wherein the second data source comprises a pricing guide book vendor.

13. The method of claim 1, wherein the combined results of the search of the first data source with the results of the search of the second data source are presented in a second common interface, the second common interface enables a client to select one or both of the first search parameters and the second search parameters from the second common interface in order to further narrow the combined search results.

14. The method of claim 13, wherein the common interface displays both of the first search parameters and the second search parameters simultaneously; and wherein the second common interface displays both of the first search parameters and the second search parameters simultaneously.

15. A client device configured to receive data searched from a plurality of data sources, the client device comprising:

at least one computer comprising at least one a processor, at least one memory, and at least one display; and wherein the at least one memory has stored instructions which, when executed, cause the processor to:

transmit, from the client device to a host system, an interface request to search, the interface request being associated with a user account;

the interface request indicative to the host system to:

process the interface request to determine a first data source and a second data source associated with the user account, the first data source and the second data source being selected from vehicle history report vendors, pricing guide book vendors, financing vendors, vehicle demand data vendors, or vehicle data sources, the first data source being different from the second data source;

assemble a common interface comprising search parameters associated with the first data source and the second data source;

transmit the common interface comprising search parameters to the client device for display, wherein a first section of the common interface includes first search parameters associated with the first data source and a second section of the common interface includes second search parameters associated with the second data source, wherein at least one of the second search parameters being of a different type than the first search parameters, at least one of the first search parameters indicative of a narrowing of searching criteria for searching the first data source, at least one of the second search parameters indicative of a narrowing of searching criteria for searching the second data source;

receive, at the client device, the common interface;

display, on the display of the client device, the common interface so that the common interface enables a client to select one or both of the first search parameters and the second search parameters from the common interface;

receive, via the client interacting with the common interface on the display, an indication of client-requested one or more of the first search parameters associated with the first data source and an indication of client-requested one or more second search parameters associated with the second data source, wherein the client-requested one or more first search parameters associated with the first data source is of the different type from the client-requested one or more second search parameters associated with the second data source; and transmit, to the host system, a search request including the indication of client-requested one or more of the first search parameters associated with the first data source and the indication of client-requested one or more second search parameters associated with the second data source;

the search request indicative to the host system to:

request a search of the first data source with the client-requested one or more first search parameters with the search of the first data source being narrowed by the at least one of the first search parameters and a search of the second data source with the client-requested one or more second search parameters with the search of the second data source being narrowed by the at least one of the second search parameters;

receive results of the search of the first data source with the client-requested one or more first search parameters associated with the first data source and results of the search of the second data source with the client-requested one or more second search parameters;

combine the results of the search of the first data source with the results of the search of the second data source; and transmit, to the client device for display, the combined results of the search of the first data source with the results of the search of the second data source.

16. The client device of claim 15, wherein the search request is for searching vehicles;
   wherein the at least one of the first search parameters is indicative of a first vehicle feature in order to narrow the search of the first data source;
   wherein the at least one of the second search parameters is indicative of a second vehicle feature in order to narrow the search of the second data source, wherein the first vehicle feature being different from the second vehicle feature;
   wherein the common interface further includes other search parameters separate from the first search parameters and the second search parameters;
   wherein the search parameters associated with the first data source and the second data source comprise third party search parameters;
   wherein the first data source comprises a $1^{st}$ third party data source;
   wherein the second data source comprises a $2^{nd}$ third party data source; and
   wherein the search parameters associated with the first data source and the second data source comprise third party search parameters.

17. The client device of claim 16, wherein the common interface further includes a separate section for the other search parameters, the separate section being separate from the first section that includes the first search parameters associated with the $1^{st}$ third party data source and the second section that includes the second search parameters associated with the $2^{nd}$ third party data source.

18. The client device of claim 17, further comprising instructions which, when executed, cause the processor to receive, via the client interacting with the common interface on the display, an indication of client-requested one or more of the other search parameters associated with a local data source;
   wherein the search request is further indicative to the host system to:
   search the local data source using the client-requested one or more other search parameters in order to determine local search results; and
   combine the results of the search of the first data source, the results of the search of the second data source, and the determined local search results.

19. The client device of claim 18, wherein the client device receives a retransmission of the local search parameters, the first search parameters and the second search parameters to the client device for display along with the search results.

20. The client device of claim 15, wherein the common interface includes the first data source and the second data source determined by the host system as being associated with the user account, the host system determining which of a plurality of third party sources are permitted data sources that a user associated with the user account has permission to access; and
   wherein the transmitted search parameters include only parameters associated with the permitted data sources.

* * * * *